United States Patent
Iwata

(10) Patent No.: US 10,194,008 B2
(45) Date of Patent: Jan. 29, 2019

(54) COMMUNICATION DEVICE, NETWORK MONITORING DEVICE SYSTEM, AND INFORMATION NOTIFICATION METHOD

(71) Applicant: NEC Corporation, Tokyo (JP)

(72) Inventor: Hajime Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 15/108,002

(22) PCT Filed: Dec. 12, 2014

(86) PCT No.: PCT/JP2014/006215
§ 371 (c)(1),
(2) Date: Jun. 24, 2016

(87) PCT Pub. No.: WO2015/098030
PCT Pub. Date: Jul. 2, 2015

(65) Prior Publication Data
US 2016/0330302 A1 Nov. 10, 2016

(30) Foreign Application Priority Data
Dec. 27, 2013 (JP) .................................. 2013-270681

(51) Int. Cl.
*H04L 29/14* (2006.01)
*H04L 12/26* (2006.01)
(Continued)

(52) U.S. Cl.
CPC .......... *H04L 69/40* (2013.01); *H04L 41/0668* (2013.01); *H04L 41/20* (2013.01);
(Continued)

(58) Field of Classification Search
None
See application file for complete search history.

(56) References Cited

U.S. PATENT DOCUMENTS 6,032,266 A 2/2000 Ichinohe et al.
6,148,411 A 11/2000 Ichinohe et al.
(Continued)

FOREIGN PATENT DOCUMENTS

| JP | 7-23079 | 1/1995 |
|---|---|---|
| JP | 9-321804 | 12/1997 |
| JP | 2011-250085 | 12/2011 |

OTHER PUBLICATIONS

International Search Report and Written Opinion dated Feb. 3, 2015, in corresponding PCT International Application.

*Primary Examiner* — Candal Elpenord
(74) *Attorney, Agent, or Firm* — Finnegan, Henderson, Farabow, Garrett & Dunner, L.L.P.

(57) ABSTRACT

Disclosed embodiments include systems and methods that may promptly confirm performance information about a network element (NE) when the NE is operating as an active system. For example, disclosed embodiments may include one of communication devices that is connected, together with other communication devices, to a network monitoring device. The communication device may use a redundancy configuration with the other of the communication devices and may output, upon the occurrence of a prescribed event, prescribed information to the network monitoring device about what the communication device measured when performing a prescribed operation as an active system. The network monitoring device may monitor a redundancy system for switching the plurality of communication devices between an active system and a standby system. The network monitoring device may also display prescribed information about one of the communication devices when the communication device operates as an active system.

12 Claims, 6 Drawing Sheets

(51) Int. Cl.
*H04L 12/24* (2006.01)
*G06F 11/20* (2006.01)

(52) U.S. Cl.
CPC .............. *H04L 41/22* (2013.01); *H04L 43/00* (2013.01); *H04L 43/065* (2013.01); *G06F 11/2005* (2013.01)

(56) References Cited

U.S. PATENT DOCUMENTS

| | | | |
|---|---|---|---|
| 6,505,311 | B1 | 1/2003 | Ichinohe et al. |
| 6,760,339 | B1 * | 7/2004 | Noel ................ G06F 1/14 361/788 |
| 6,914,879 | B1 * | 7/2005 | Kleine-Altekamp ................ H04J 3/1611 370/219 |
| 6,983,362 | B1 * | 1/2006 | Kidder ................ G06F 11/0709 707/999.002 |
| 7,821,923 | B2 * | 10/2010 | Kakadia ................ H04L 12/14 370/221 |
| 2003/0093559 | A1 | 5/2003 | Ichinohe et al. |
| 2003/0120822 | A1 * | 6/2003 | Langrind ............ H04L 29/1232 709/251 |
| 2005/0076231 | A1 | 4/2005 | Ichinohe et al. |
| 2006/0280117 | A1 * | 12/2006 | Gopinadhan ......... G06F 11/203 370/216 |
| 2009/0046655 | A1 * | 2/2009 | Zhao ................ H04W 24/04 370/331 |
| 2011/0299386 | A1 * | 12/2011 | Negoto ................ H04L 45/22 370/221 |

* cited by examiner

Fig. 3

EXAMPLE OF DISPLAY ON NMS SCREEN

PERFORMANCE INFORMATION (NE1, 2)

| DATE AND TIME | THE NUMBER OF SENDINGS/RECEPTIONS | THE NUMBER OF COMMUNICATION ERRORS |
|---|---|---|
| APRIL 1 08:30:00~09:30:00 | 1253 | 53 |
| APRIL 1 09:30:00~10:30:00 | 654 | 4 |
| APRIL 1 10:30:00~11:30:00 | 3456 | 56 |
| APRIL 1 11:30:00~12:30:00 | 4400 | 20 |
| APRIL 1 12:30:00~13:30:00 | 56 | 6 |
| APRIL 1 13:30:00~14:30:00 | 763 | 40 |
| ... | ... | ... |

WINDOW DISPLAYING PERFORMANCE INFORMATION FROM NEs 3 AND 4

COMMUNICATION DEVICE, NETWORK MONITORING DEVICE SYSTEM, AND INFORMATION NOTIFICATION METHOD

CROSS-REFERENCE TO RELATED PATENT APPLICATIONS

This application is a National Stage Entry of International Application No. PCT/JP2014/006215, filed Dec. 12, 2014, which claims priority from Japanese Patent Application No. 2013-270681, filed Dec. 27, 2013. The entire contents of the above-referenced applications are expressly incorporated herein by reference.

TECHNICAL FIELD

The present invention relates to a communication device, a network monitoring device, a system and an information notification method, and in particular, relates to a communication device, a network monitoring device, a system and an information notification method for monitoring the operation state of a system.

BACKGROUND ART

It is well known that a general communication system comprises a plurality of NEs (Network Elements), where each of the NEs measures performance information and notifies it to an NMS (Network Management System). The performance information may be the number of pieces of data sent to or received from opposing NEs. The NMS displays performance information notified from each of the NEs on a screen provided in the NMS itself. By checking the performance information displayed on the NMS screen, an administrator of the communication system grasps the operation state of the general communication system.

Incidentally, a system comprising redundantly configured devices (hereafter, referred to as a "redundant system") is known. A redundant system is disclosed in Patent Literature 1 (PTL 1) described below.

The redundant system of PTL 1 comprises two devices which have the same function to process an inputted signal. Each of the devices notifies its internal status to the other and, on the basis of the own internal status and an internal status notified from the other device, automatically determines whether itself currently is to be the active device or the standby device, thereby constituting the redundant configuration. One of the devices having determined itself to be the active device processes an inputted signal.

As the configuration and operation described above, in the redundant system of PTL 1, two devices automatically constitute a redundant configuration and one of them having determined itself to be the active device processes an inputted signal.

CITATION LIST

Patent Literature

[PTL 1] Japanese Patent Application Laid-Open No. H7-23079

SUMMARY OF INVENTION

Technical Problem

When the technology represented by the redundant system of PTL 1 is employed in the above-mentioned general communication system, two NEs constitute a redundant configuration, where either of the NEs determines itself to be the active NE and processes an inputted signal.

However, the above-described performance information is not categorized as such an "inputted signal". That is, the performance information is not what is processed (notified to the NMS) only by one of the NEs having determined itself to be the active NE. Therefore, in such a general communication system employing the redundant system technology of PTL 1 (hereafter, referred to as the "communication system of PTL 1"), each and every one of the NEs notifies the NMS of performance information it has measured, similarly to in the original general communication system. That is, both when operating as the active NE and when operating as the standby NE, each of the NEs notifies the NMS of performance information it has measured during the operations. As a result, the NMS displays, on the screen provided in itself, both performance information measured by each of the NEs during its operation as the active NE and that measured by the same NE during operation as the standby NE, in a mixed manner.

Because of the mixed display described above, when an administrator of the communication system of PTL 1 wants to check performance information measured by the NEs while operating as the active NE, the administrator needs to extract the required performance information from the whole performance information displayed on the NMS screen. Because of the necessity of such extraction work, it is not possible for the administrator of the communication system of PTL 1 to promptly check performance information measured by the NEs while operating as the active NE.

That is, the communication system of PTL 1 has a problem in that an administrator of the communication system cannot promptly check performance information measured by the NEs while operating as the active NE even when the administrator wants to check the performance information for the purpose of grasping the operation state of the system (whose operation is performed by the active NE).

The present invention aims to provide a communication device, a network monitoring device, a system and an information notification method that solves the above-described problems.

Solution to Problem

To achieve the above-described object, a communication device of the present invention is a communication device connected to a network monitoring device, together with another communication device, wherein the communication device constitutes a redundant configuration together with the another communication device and, upon occurrence of a predetermined event, outputs predetermined information it has measured while performing a predetermined operation as the active device of the redundant configuration, to the network monitoring device.

To achieve the above-described object, a network monitoring device of the present invention is a network monitoring device for monitoring a redundant system in which a plurality of communication devices are each switched between being an active device and being a reserve device, of the redundant system, wherein the network monitoring device displays predetermined information measured by the plurality of communication devices while they were operating as an active device of the redundant system.

To achieve the above-described object, a system of the present invention is a system comprising a plurality of communication devices and a network monitoring device. The communication device is the communication device connected to a network monitoring device, together with another communication device, wherein the communication device constitutes a redundant configuration together with the another communication device and, upon occurrence of a predetermined event, outputs predetermined information it has measured while performing a predetermined operation as the active device of the redundant configuration, to the network monitoring device. The network monitoring device of the present invention is the network monitoring device for monitoring a redundant system in which a plurality of communication devices are each switched between being an active device and being a reserve device, of the redundant system, wherein the network monitoring device displays predetermined information measured by the plurality of communication devices while they were operating as an active device of the redundant system.

To achieve the above-described object, an information notification method of the present invention is an information notification method, wherein each of first means together constituting a redundant configuration, upon occurrence of a predetermined event, notifies predetermined information it has measured while performing a predetermined operation as an active system, to a second means.

Advantageous Effects of Invention

According to the present invention, it becomes possible for an administrator of a system to promptly check performance information measured by a plurality of devices comprised in the system while they were performing predetermined operation. For example, the system administrator can promptly check the measured performance information while the plurality of devices comprised in the system were performing predetermined operation as an active device.

BRIEF DESCRIPTION OF DRAWINGS

FIG. 3 is a diagram showing an example of performance information displayed on a screen of an NMS (Network Management System) comprised in the communication system in the first exemplary embodiment of the present invention.

DESCRIPTION OF EMBODIMENTS

Figure 1:
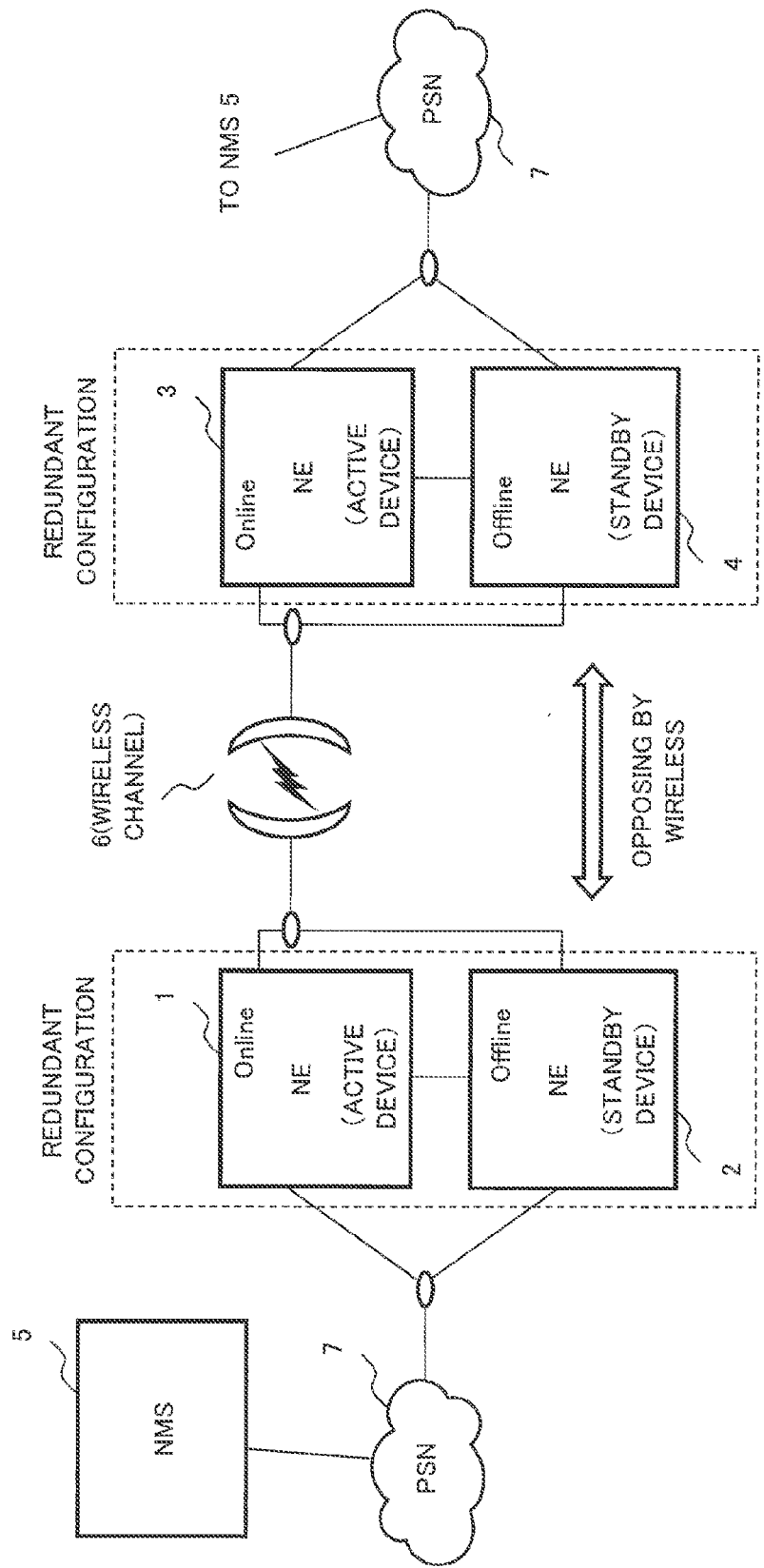
FIG. 1 is a diagram showing an example of a configuration of a communication system in a first exemplary embodiment of the present invention.

Next, exemplary embodiments of the present invention will be described in detail, with reference to drawings. FIG. 1 is a diagram showing an example of a configuration of a communication system in a first exemplary embodiment of the present invention.

First Exemplary Embodiment

As shown in FIG. 1, the communication system in the first exemplary embodiment of the present invention comprises two pairs of NEs (Network Elements), each pair having a redundant configuration, and an NMS (Network Management System).

The two pairs of NEs with a redundant configuration oppose to each other, where the active NEs of the respective pairs communicate each other via a wireless channel. Each of the NEs measures performance information at constant time intervals. The performance information mentioned above may be the number of pieces of communication data which are sent or received while performing communication with the opposing NE (hereafter, referred to as "the number of communication data sendings/receptions").

When a failure occurs in either of the active NEs while performing the communication, the active NE in failure hands over its processing to the standby NE in the same redundant configuration, and notifies the NMS of performance information it has measured during its operation as the active NE. Similarly, after taking over the processing from the active NE, the standby NE operates as the current active NE of the redundant configuration and then, when a failure occurs in itself, hands over the processing to the NE which originally was the active NE, and notifies the NMS of performance information it has measured during its operation as the current active NE. Receiving, from each of the NEs, notification of performance information measured by the NE while operating as the active NE, the NMS totalizes those pieces of performance information it has received, and stores the result into a memory provided in itself at constant time intervals. By operating the NMS, an administrator (NMS operator) of the communication system of the present exemplary embodiment has thus stored performance information displayed on a screen provided in the NMS.

As a result of the above-mentioned operation, on the screen provided in the NMS, the performance information (the number of communication data sendings/receptions) measured by each of the NEs during its operation as the active NE is displayed. The administrator of the communication system of the present exemplary embodiment can promptly check the performance information measured by each of the NEs during its operation as the active NE, and thereby can grasp the operation state of the communication system.

Hereinafter, detailed descriptions will be given of the configurations, functions and operations of the communication system in the first exemplary embodiment of the present invention.

[Description of Configuration]

First, a detailed description will be given of the configurations and functions of the communication system in the first exemplary embodiment of the present invention.

(1) Configuration of the Communication System in the First Exemplary Embodiment of the Present Invention As shown in FIG. 1, the communication system of the present exemplary embodiment comprises NEs 1 and 2 which are together in a redundant configuration, NEs 3 and 4 in another redundant configuration, and NMS5. The NEs 1 and 3 are the active NEs of the respective redundant configurations, and the NEs 2 and 4 are the standby NEs.

The redundant configuration of the NEs 1 and 2 and that of the NEs 3 and 4 are connected with each other via a wireless channel 6. The redundant configuration of the NEs 1 and 2 and that of the NEs 3 and 4 are each connected with an NMS 5 via a PSN (Public Switched Network) 7. The active NE 1 is connected with the standby NE 2, because they constitute a redundant configuration. The active NE 3 is connected with the standby NE 4.

(2) Function of Each of the Components Constituting the Communication System in the First Exemplary Embodiment of the Present Invention (2-1) Function of the Active NE 1

(2-1-1) Function of the Active NE 1 (Normal State)

After being started up, the active NE 1 measures performance information at constant time intervals. As the constant time interval, the administrator of the communication system of the present exemplary embodiment may set a time period in the order of minutes, for example, 1 minute, 15 minutes or the like, to the active NE 1. The performance information mentioned above may be the number of pieces of communication data sent or received while performing wireless communication with the active NE 3.

In parallel with the measurement of performance information, the active NE 1 performs the wireless communication with the active NE 3.

(2-1-2) Function of the Active NE 1 (Upon Failure Occurrence)

When a failure occurs in itself while performing communication with the active NE 3, the active NE 1 outputs a packet indicating the failure occurrence (hereafter, referred to as a "failure notification") to the standby NE 2, and hands over the processing having been performed by the NE 1 to the standby NE2. Subsequently to the handover of processing to the standby NE 2, the active NE 1 outputs, to the NMS 5, performance information it has measured while operating as the active NE, by including the performance information in a failure notification. After thus outputting the performance information by including it in the failure notification, to the NMS 5, the active NE 1 operates as the current standby NE. Here, before starting to operate as the current standby NE, the active NE 1 may once reset itself, in order to restore its own failure.

(2-2) Function of the Standby NE 2

Similarly to the active NE 1, the standby NE 2 measures performance information at constant time intervals. Upon receiving a failure notification inputted from the active NE 1, the standby NE 2 takes over processing from the active NE 1, and performs wireless communication with the NE 3 as the current active NE. When a failure occurs in itself while performing communication with the NE 3 as the current active NE, the standby NE 2 performs the process described above in "(2-1-2) function of the active NE 1 (upon failure occurrence)". In applying (2-1-2) to the standby NE 2, "NE 1" is read as "NE 2", and "NE 2" as "NE 1". As a result of the process of (2-1-2), the standby NE 2 operates as the current standby NE again.

(2-3) Functions of the Active NE 3 and the Standby NE 4

The active NE 3 has the same function as that of the active NE 1. The standby NE 4 has the same function as that of the standby NE 2.

(2-4) Function of the NMS 5

Upon receiving a failure notification inputted from the NE 1 or 2, the NMS 5 extracts performance information, that is, the number of communication data sendings/receptions, from the failure notification, and performs an addition process on the extracted number. Specifically, after extracting, from the failure notification, the number of communication data sendings/receptions corresponding to the included performance information, the NMS 5 adds the number of communication data sendings/receptions extracted this time to that extracted previously. When the NMS 5 has extracted the number of communication data sendings/receptions for the first time, the addition is performed assuming that the previously extracted number of communication data sendings/receptions is zero.

At constant time intervals, the NMS 5 stores thus summed number of communication data sendings/receptions into a memory provided in itself, as performance information measured by the corresponding NE during its operation as the active NE of the corresponding redundant configuration. As the above-mentioned constant time interval, an administrator of the communication system of the present exemplary embodiment may set a time period such as one hour or one day, to the NMS 5. Further, every time storing thus summed number of communication data sendings/receptions, the NMS 5 may subsequently regard the previously extracted numbers of communication data sendings/receptions as zero, and clear the total number of communication data sendings/receptions having been summed up until that time to be zero.

When the administrator of the communication system of the present exemplary embodiment has performed a predetermined operation, the NMS 5 displays the stored performance information on a screen provided in itself.

The NMS 5 performs the above-described operation also when it has received a failure notification inputted from the NE 3 or 4. In that case of operation by the NMS 5, "NE 1" and "NE 2" in the above description are read as, respectively, "NE 3" and "NE 4".

[Description of Operations]

Figure 2:
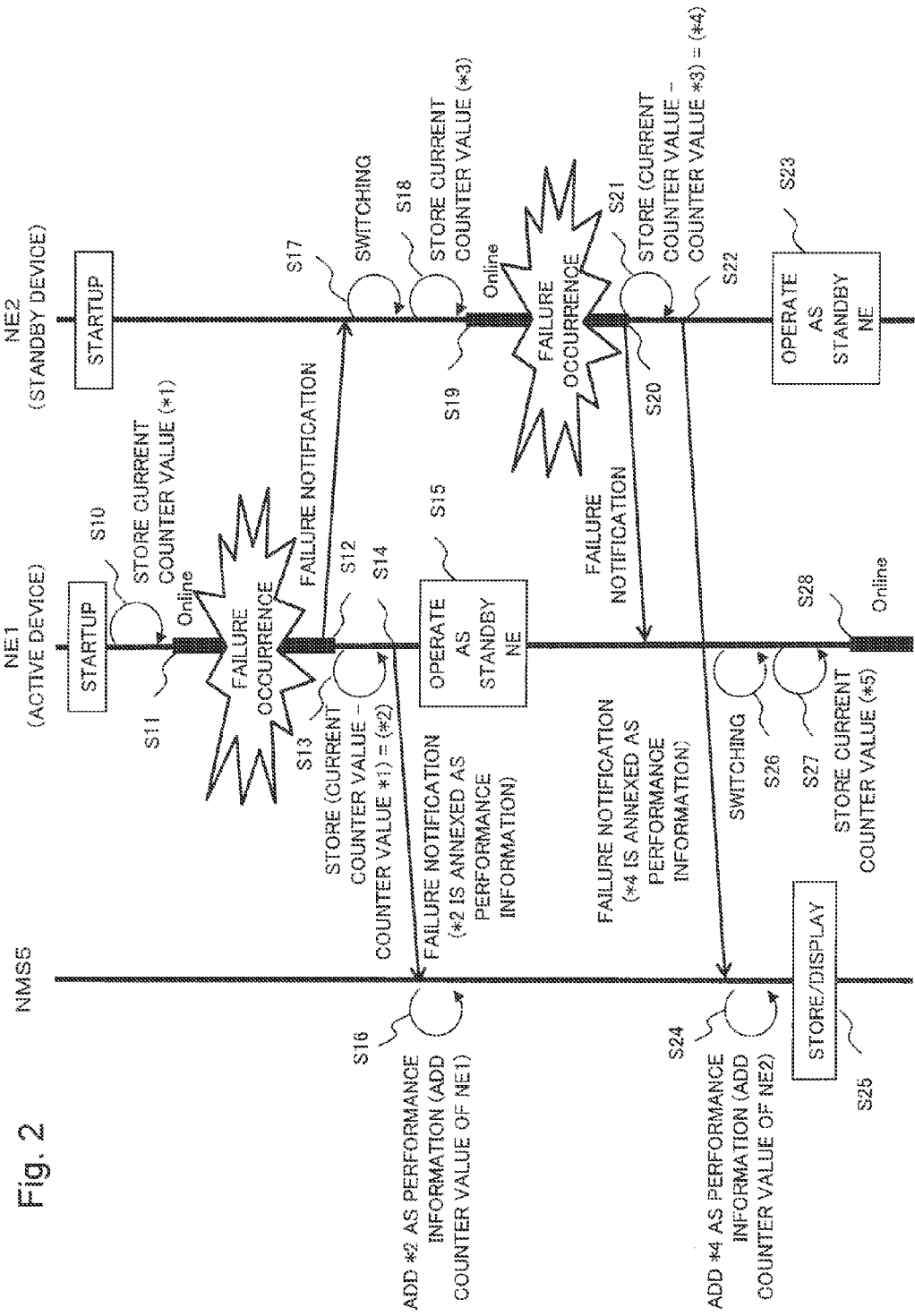
FIG. 2 is a diagram for explaining operation of the communication system in the first exemplary embodiment of the present invention.

FIG. 2 is a diagram for explaining operation of the communication system in the first exemplary embodiment of the present invention. FIG. 3 is a diagram showing an example of performance information displayed on the screen of the NMS (Network Management System) comprised in the communication system in the first exemplary embodiment of the present invention.

Using FIGS. 2 and 3, details of operation of the communication system of the present exemplary embodiment will be described below. Here, it is assumed that, after being started up, the active NE 1 and the standby NE 2 each measure performance information (that is, the number of communication data sendings/receptions) at constant time intervals, in parallel with operations of S10 to S28 described below. Also assumed is that, when having measured the number of communication data sendings/receptions, each of the active NE 1 and the standby NE 2 increments the value of a counter provided in itself by a value corresponding to the measured number of sendings/receptions. The initial value is set at zero for both of the counters.

(1) Operation of the Active NE 1 (Normal State)

(S10)

First, after starting up, the active NE 1 stores the value, zero, of the above-mentioned counter provided in itself.

(S11)

Next, the active NE 1 starts performing wireless communication with the active NE 3.

Here, even while performing, and in parallel with, the wireless communication, the active NE 1 continues measuring the number of communication data sendings/receptions at constant time intervals and incrementing the counter value by a value corresponding to the measured number of sendings/receptions. In FIG. 2, the state in which the active NE 1 is performing the wireless communication and incrementing the counter value is denoted as an "Online" state, which is represented by a bold line.

(2) Operation of the Active NE 1 (Upon Failure Occurrence)

(S12)

Next, if any failure occurs in itself while performing the wireless communication, the active NE 1 sends a packet indicating the failure occurrence, that is, a failure notification to the standby NE 2.

The active NE 1 may detect such occurrence of any failure in itself by distinguishing whether or not the communication quality of the wireless channel 6 between itself and the active NE 3 has been degraded for longer than a predetermined time period. It is because, if the communication quality has been degraded for longer than a predetermined time period, it is possible that a function unit for performing the communication is in failure. The predetermined time period is a sufficiently long one, which is set by the administrator of the communication system of the present exemplary embodiment. When the active NE 1 has determined that the communication quality of the wireless channel 6 has been degraded for longer than the predetermined time period, it may recognize that some kind of failure has occurred in itself, and accordingly send a failure notification to the standby NE 2.

(S13)

Next, after sending the failure notification to the standby NE 2, the active NE 1 stores performance information (the number of communication data sendings/receptions) it has measured while performing the wireless communication (during the period denoted by "Online" in FIG. 2).

Specifically, upon sending the failure notification to the standby NE 2, the active NE 1 acquires the value of its counter at that time. Then, the active NE 1 calculates and stores the difference between thus acquired counter value and the counter value stored in S10 described above (that is, the counter value before starting to perform the wireless communication).

(S14)

Next, the active NE 1 sends to the NMS 5 the performance information stored in S13 described above by including it into a packet indicating the failure occurrence, that is, a failure notification.

(S15)

Next, the active NE 1 hands over its processing to the standby NE 2, and then starts operating as the current standby NE.

Specifically, as the current standby NE, the active NE 1 performs only operation of measuring performance information, that is, the number of communication data sendings/receptions, at constant time intervals, and incrementing the value of its counter by the measured number of communication data sendings/receptions. Here, before starting to operate as the current standby NE, the active NE 1 may once reset itself, in order to restore the own failure.

(S16)

Upon receiving the failure notification inputted from the active NE 1, after the process of S14 described above, the NMS 5 extracts, from the failure notification, performance information, that is, the number of communication data sendings/receptions (measured by the NE 1 while performing the wireless communication as the active NE), and adds the number of communication data sendings/receptions thus extracted this time to that extracted previously.

At the present stage, there exists no previously extracted number of communication data sendings/receptions, and accordingly, the NMS 5 performs the addition process assuming that the previously extracted number of communication data sendings/receptions is zero.

(3) Operation of the Standby NE 2

(S17)

On the other hand, upon receiving the failure notification from the active NE 1 by the process of S12 described above, the standby NE 2 takes over processing from the active NE 1.

The standby NE 2 then operates as the current active NE of the redundant configuration, and accordingly in the following description, it is referred to as the "current active NE 2".

(S18)

Next, the current active NE 2 stores the value of the counter provided in itself, similarly to the operation of the NE 1 in S10 described above.

(S19)

Then, the current active NE 2 performs wireless communication with the active NE 3, similarly to the operation of the NE 1 in S11 described above.

Here, even while performing, and in parallel with, the wireless communication, the current active NE 2 continues measuring the number of communication data sendings/receptions at constant time intervals and incrementing the counter value by a value corresponding to the measured number of communication data sendings/receptions. In FIG. 2, the state in which the current active NE 2 is performing the wireless communication and incrementing the counter value is denoted as an "Online" state, which is represented by a bold line.

(S20)

Next, similarly to the operation of the NE 1 in S12 described above, if any failure occurs in itself while performing the wireless communication, the current active NE 2 sends a failure notification to the NE 1 currently operating as the standby NE.

The current active NE 2 may send the failure notification to the NE 1 when it determines that the communication quality of the wireless channel 6 has been degraded for longer than a predetermined time period, thereby recognizing that some kind of failure has occurred in itself.

(S21)

Next, similarly to the operation of the NE 1 in S13 described above, after sending the failure notification, the current active NE 2 stores performance information, that is, the number of communication data sendings/receptions it has measured while performing the wireless communication with the NE 3 (during the period denoted as "Online" in FIG. 2).

Specifically, upon sending the failure notification, the current active NE 2 acquires the value of its counter at that time. Then, the current active NE 2 calculates and stores the difference between thus acquired counter value and the counter value stored in S18 described above (that is, the counter value before starting to perform the wireless communication with the NE 3).

(S22)

Next, similarly to the operation of the NE 1 in S14 described above, the current active NE 2 sends to the NMS 5 the performance information stored in S21 described above, by including it in the failure notification.

(S23)

Next, similarly to the operation of the NE 1 in S15 described above, the current active NE 2 hands over its processing to the NE1 having been operating as the current standby NE, and then the NE 2 starts operating as the standby NE.

Specifically, as the current standby NE, the NE 2 performs only operation of measuring performance information, that is, the number of communication data sendings/receptions, at constant time intervals, and incrementing the value of its counter by a value corresponding to the measured number of communication data sendings/receptions. Here, before starting to operate as the standby NE, the NE 2 may once reset itself, in order to restore the own failure.

(S24)

Upon receiving the failure notification inputted from the active NE 2, after the process of S22 described above, the NMS 5 extracts, from the failure notification, performance information, that is, the number of communication data sendings/receptions (measured by the NE 2 while performing the wireless communication as the active NE), and adds the number of communication data sendings/receptions thus extracted this time to that extracted previously.

At the present stage, the NMS 5 has already extracted the number of communication data sendings/receptions in S16 described above, and accordingly adds the number of communication data sendings/receptions extracted in the present processing to that extracted previously (in S16). As a result, the NMS 5 sums up all of the numbers of communication data sendings/receptions measured by the NEs 1 and 2 while they were performing wireless communication with the NE 3 as the active NE.

(4) Display Operation at the NMS 5

(S25)

At constant time intervals, the NMS 5 stores thus summed number of communication data sendings/receptions into the memory provided in itself, as performance information measured by the NEs 1 and 2 while operating as the active NE.

After that, while it is not illustrated, if a predetermined operation is performed by the administrator (NMS operator) of the communication system of the present exemplary embodiment, the NMS 5 displays the stored performance information on the screen provided in itself.

As the constant time interval mentioned above, the administrator of the communication system of the present exemplary embodiment may set, for example, a time period such as 15 minutes or one hour, to the NMS 5. The NMS 5 may perform the above-described storing operation every 15 minutes or one hour, and may display the performance information measured during 15 minutes or one hour. Because thus displayed performance information is that on the redundantly configured NEs 1 and 2, the NMS 5 may display also characters expressing the redundantly configured NEs 1 and 2, simultaneously with the performance information.

Further, every time displaying the summed number of communication data sendings/receptions, the NMS 5 may subsequently regard the previously extracted numbers of communication data sendings/receptions as zero, and clear the total number of communication data sendings/receptions having been summed up until that time to be zero. Accordingly, the NMS 5 may display, at constant time intervals, only the number of communication data sendings/receptions it has received during each of the time intervals.

The NMS 5 may further have a time count function and accordingly, when storing performance information, store also a date and time measured using the time count function in a manner to annex it to the performance information. When a predetermined operation is performed, the NMS 5 may display the performance information with a date and time annexed to it, on the screen provided in itself.

(5) Summary of Operations of S10 to S25

As shown in S10 to S25 described above, taking failure occurrence as a trigger, each of the NEs 1 and 2 in the redundant configuration notifies the NMS 5 of only performance information it has measured while performing wireless communication as the active NE. That is, each of the redundantly configured NEs 1 and 2 notifies the NMS 5 of the number of communication data sendings/receptions it has measured while performing wireless communication as the active NE. Each of the NEs 1 and 2 never notifies the NMS 5 unnecessarily of the number of communication data sendings/receptions it has measured while operating as the standby NE of the redundant configuration (the value is zero, because the standby NE does not perform wireless communication and accordingly never send or receive communication data).

As a result, the NMS 5 can display only the number of communication data sendings/receptions measured by the NEs 1 and 2 while performing wireless communication as the active NE. The NMS 5 never displays any other data in a manner to mix it with the above-described number data.

The administrator of the communication system of the present exemplary embodiment having watched the above-described display can promptly check only the number of communication data sendings/receptions measured by the NEs 1 and 2 while performing wireless communication as the active NE.

(6) Supplement to Operations of the NEs 1 and 2

It will be additionally described here that, upon receiving a failure notification from the NE 2 by the process of S20 described above, the NE 1 operates as described in S26 to S28 below.

(S26)

Receiving the failure notification from the NE 2, the NE 1 takes over processing from the NE 2.

Because the NE 1 subsequently operates as the active NE, it is called the "current active NE 1" in the following description.

(S27)

Taking over the processing from the NE 2, the current active NE 1 stores the value of its counter at that time.

(S28)

Then, the current active NE 1 performs wireless communication with the active NE 3.

After that, when a failure occurs in itself, the current active NE 1 performs operations of S12 to S15 described above. As a result, every time a failure occurs in itself, the NE 1 notifies the NMS 5 of performance information (that is, the number of communication data sendings/receptions) it has measured while performing wireless communication as the active NE. On the other hand, after S23, upon receiving a failure notification from the current active NE 1 again, the current standby NE 2 performs operations of S17 to S19 described above, and operates as the active NE. If a failure occurs in itself while operating as the active NE, the NE 2 performs operations of S20 to S23 described above. As a result of the operations described above, every time a failure occurs in itself, the NE 2 notifies the NMS of performance information it has measured while performing wireless communication as the active NE.

(6) Other Operations (6-1) About Performance Information.

While the above descriptions have been given of a case where the performance information is the number of communication data sendings/receptions, the performance information may also be an error rate of communication data (hereafter, referred to as "the number of communication errors"), the transmission rate, a modulation/demodulation method used in performing communication, the transmission power amount or the reception power amount. That is, the NEs 1 and 2 may each comprise counters for respective ones of the number of communication data sendings/receptions, the number of communication errors, and the like, measure those values at constant time intervals and increment the values of the respective counters by the respective measured values, and accordingly in a manner compatible with that situation the NEs 1 and 2 may perform S10 to S15 and S17 to S23 described above. In that case, the NMS 5 performs S16, S24 and S25 described above on each of the number of communication data sendings/receptions, the number of communication errors, and the like. As a result, the NMS 5 can display the number of communication data sendings/receptions, the number of communication errors, and the like which have been measured by the redundantly configured NEs 1 and 2 while they were performing wireless communication as the active NE.

Instead of such kinds of performance information, the NEs 1 and 2 may measure information relating to system operation such as the number of failure occurrences, and then notify the NMS of the measured information relating to system operation by performing S10 to S15 and S17 to S23 described above. The NEs 1 and 2 may notify such information relating to system operation in addition to performance information, to the NMS. The NMS 5 can display each of such kinds of information notified to it.

(6-2) Operations of the NEs 3 and 4 in a Redundant Configuration and the NMS 5.

While the above descriptions have been given of operations of the redundantly configured NEs 1 and 2, the NEs 3 and 4 in another redundant configuration may perform the same operations as that of the NEs 1 and 2, specifically the processes of S10 to S23. Accordingly, the redundantly configured NEs 3 and 4 notify the NMS 5 of performance information they have measured while performing wireless communication as the active NE. In that case, the NMS 5 performs the processes of S16, S24 and S25, described above, on each of the redundantly configured NEs 1 and 2 and the redundantly configured NEs 3 and 4, and accordingly displays performance information measured by the redundantly configured NEs 3 and 4 while performing wireless communication as the active NE. When displaying the performance information received from the redundantly configured NEs 3 and 4 in S25, the NMS 5 may display also characters expressing the redundantly configured NEs 3 and 4.

As a result of the above-described operation, as shown in FIG. 3, the NMS can display, for each of the redundant configurations, performance information (the number of communication data sendings/receptions or the number of communication errors) measured by the NEs in the redundant configuration while performing wireless communication as the active NE, on the screen provided in itself.

(6-3) Other Operations of the NEs and the NMS 5 (1)

While it has been described above that each of the NEs notifies the NMS of performance information it has measured while operating as the active NE, taking failure occurrence as a trigger, the trigger for notifying performance information is not limited to failure occurrence. Any kind of trigger may be taken by each of the NEs for its notifying performance information it has measured while operating as the active NE. For example, each of the NEs may notify performance information it has measured while operating as the active system, to the NMS, when a predetermined time point has come. The predetermined time point is set to each of the NEs by the administrator of the communication system of the present exemplary embodiment.

While the above descriptions have been given of a case where the NEs are in a duplexed configuration, they may be in a N+1 or N+m configuration (N is the number of current active NEs, and m the number of reserve NEs). In that case, the current active NEs perform S10 to S15 described above similarly to the active NE 1, and the current reserve NEs perform S17 to S23 similarly to the standby NE 2.

(6-4) Other Operations of the NMS 5

It has been described above that the NMS 5 displays performance information it has stored, taking execution of a predetermined operation as a trigger. The NMS 5 may display stored performance information at constant time intervals, regardless of whether a predetermined operation is executed or not. Alternatively, every time it is notified of performance information from the NEs in S16 or S24 described above and then performs addition of the performance information, the NMS 5 may display the performance information after the addition.

(6-5) Other Operations of the NEs and the NMS 5 (2)

It has been described above that each of the NEs takes failure occurrence as a trigger for notifying the NMS 5 of performance information. Instead of performing such operation, each of the NEs may notify the NMS 5 of performance information when the performance information is requested by the NMS 5. Specifically, each of the NEs may notify the NMS 5 of performance information when it has received a signal for requesting the performance information from the NMS 5. The NMS 5 outputs such a signal for requesting performance information to each of the NEs at constant time intervals, thereby requesting performance information from the NE. In that case, each of the NEs notifies the NMS 5 of performance information if it is operating as the active NE at that time.

Description of Advantageous Effect

According to the present exemplary embodiment, an administrator of the communication system can promptly check performance information measured by redundantly configured NEs comprised in the system while they were performing wireless communication as the active NE.

It is because, in the communication system of the present exemplary embodiment, each of the NEs outputs only performance information it has measured while performing wireless communication as the active NE (hereafter, referred to as "useful performance information") to the NMS. As a result, the NMS can display only such useful performance information, and the administrator of the communication system accordingly can promptly check the useful performance information.

Second Exemplary Embodiment

Next, a second exemplary embodiment of the present invention will be described.

In a communication system of the second exemplary embodiment, if the NMS determines that it has not received yet a failure notification from the active NE 1, it requests the active NE 1 to resend performance information to have been included in the failure notification having not reached yet, and the active NE 1 accordingly resends the performance information.

To enable the NMS to determine non-arrival of a failure notification, the active NE 1 sends a sequence ID to the NMS by including it in each failure notification. The sequence ID is a number indicating the sending order, and accordingly, each time the active NE 21 sends a failure notification, it increments the sequence ID by 1, and then sends the sequence ID by including it in the failure notification. Each time receiving a failure notification, the NMS distinguishes whether the sequence ID included in the failure notification has been incremented by 1. In case the increment of the currently received sequence ID from the last one is not 1, the NMS determines that some failure notification has not reached it from the NE 1.

[Description of Configuration]

Figure 4:
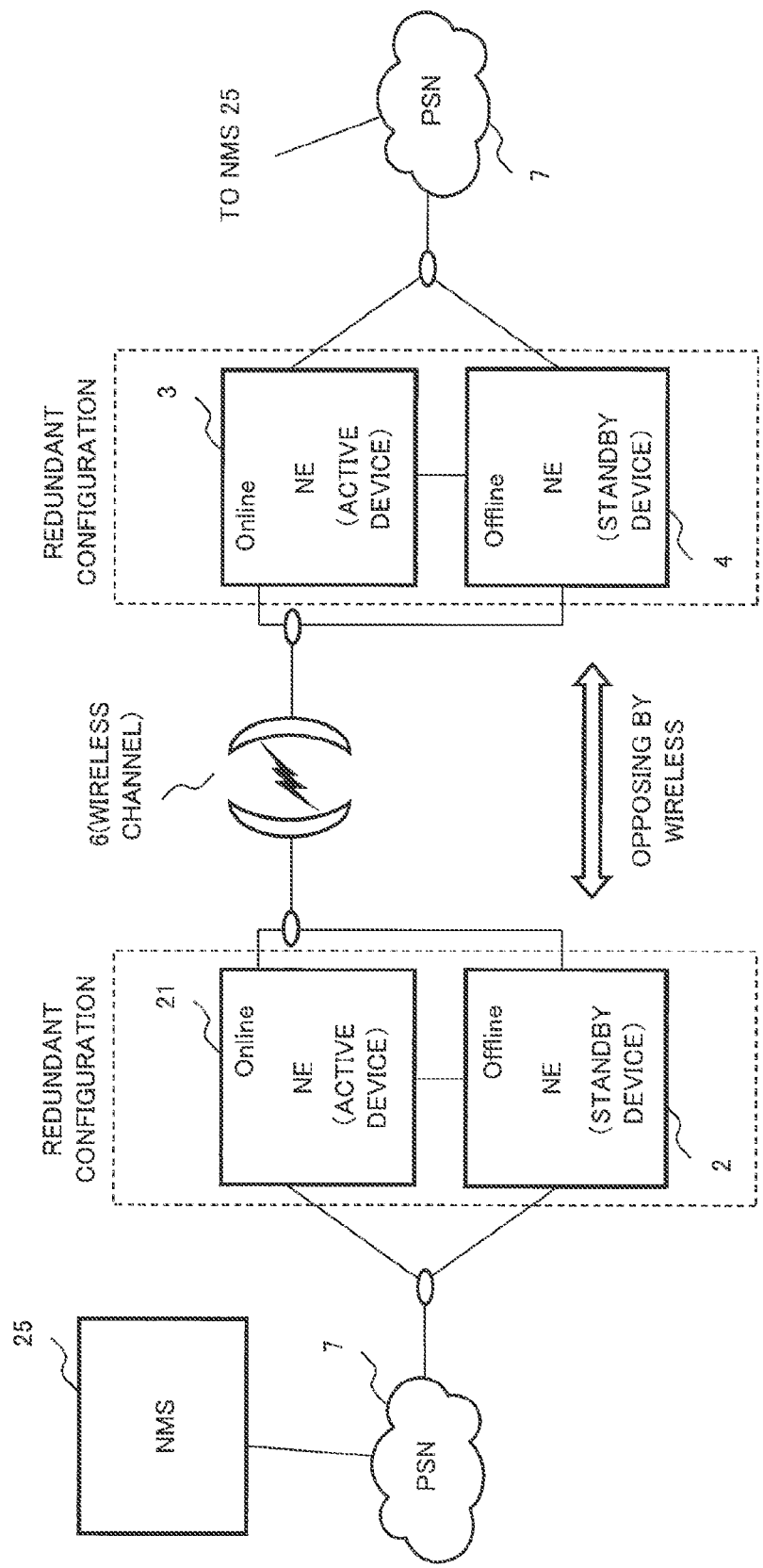
FIG. 4 is a diagram showing an example of a configuration of a communication system in a second exemplary embodiment of the present invention.

(1) Configuration of a Communication System in the Second Exemplary Embodiment of the Present Invention FIG. 4 is a diagram showing an example of a configuration of the communication system in the second exemplary embodiment of the present invention.

As shown in FIG. 4, the communication system of the present exemplary embodiment comprises an NE 21 and an NMS 25 in place of, respectively, the NE 1 and the NMS 5.

(2) Function of Each of Components Constituting the Communication System in the Second Exemplary Embodiment of the Present Invention (2-1) Function of the Active NE 21

When starting wireless communication, the active NE 21 sends a packet indicating the start of communication (hereafter, referred to as an "Online notification") to the NMS 25. The active NE 21 sends the Online notification and the failure notification described above after including a sequence ID into each of them. The sequence ID is a number indicating the order of packet sent to the NMS 25, and the active NE 21 increments the sequence ID by 1 each time it outputs the Online notification or the failure notification. An initial value of the sequence ID is set to the active NE 21 by an administrator of the communication system of the present exemplary embodiment.

Upon outputting a failure notification, the active NE 21 stores a sequence ID included in the failure notification and corresponding performance information in a manner to correlate them with each other. Then, if receiving a packet for requesting it to resend performance information (hereafter, referred to as a "reacquisition notification") from the NMS 25, the active NE 21 extracts a sequence ID included in the reacquisition notification. Extracting the sequence ID, the active NE 21 outputs, to the NMS 25, performance information stored in a manner to be correlated with the sequence ID, by including the performance information in a packet representing a response to the reacquisition notification (hereafter, referred to as a "reacquisition response notification").

(2-2) Function of the NMS 25

Upon receiving an Online notification or a failure notification, the NMS 25 extracts a sequence ID from them and stores the extracted sequence ID. The NMS 25 then distinguishes whether or not the sequence ID stored this time is incremented by 1 from that stored last time. If it is determined that the increment between the sequence IDs is 1, the NMS 25 performs no operation, and waits to receive an Online notification or a failure notification next time. If it is determined that the increment is not 1, the NMS 25 outputs, to the active NE 21, a sequence ID between the sequence ID stored this time and that stored last time, by including it in a reacquisition notification. Upon receiving a reacquisition response notification from the active NE 21, the NMS 25 extracts performance information from the reacquisition response notification.

Configurations and functions other than those described above are the same as those of the communication system in the first exemplary embodiment, and accordingly, to each of them, the same sign as that used in the first exemplary embodiment will be assigned, and their descriptions will be omitted here.

[Description of Operation]

Figure 5:
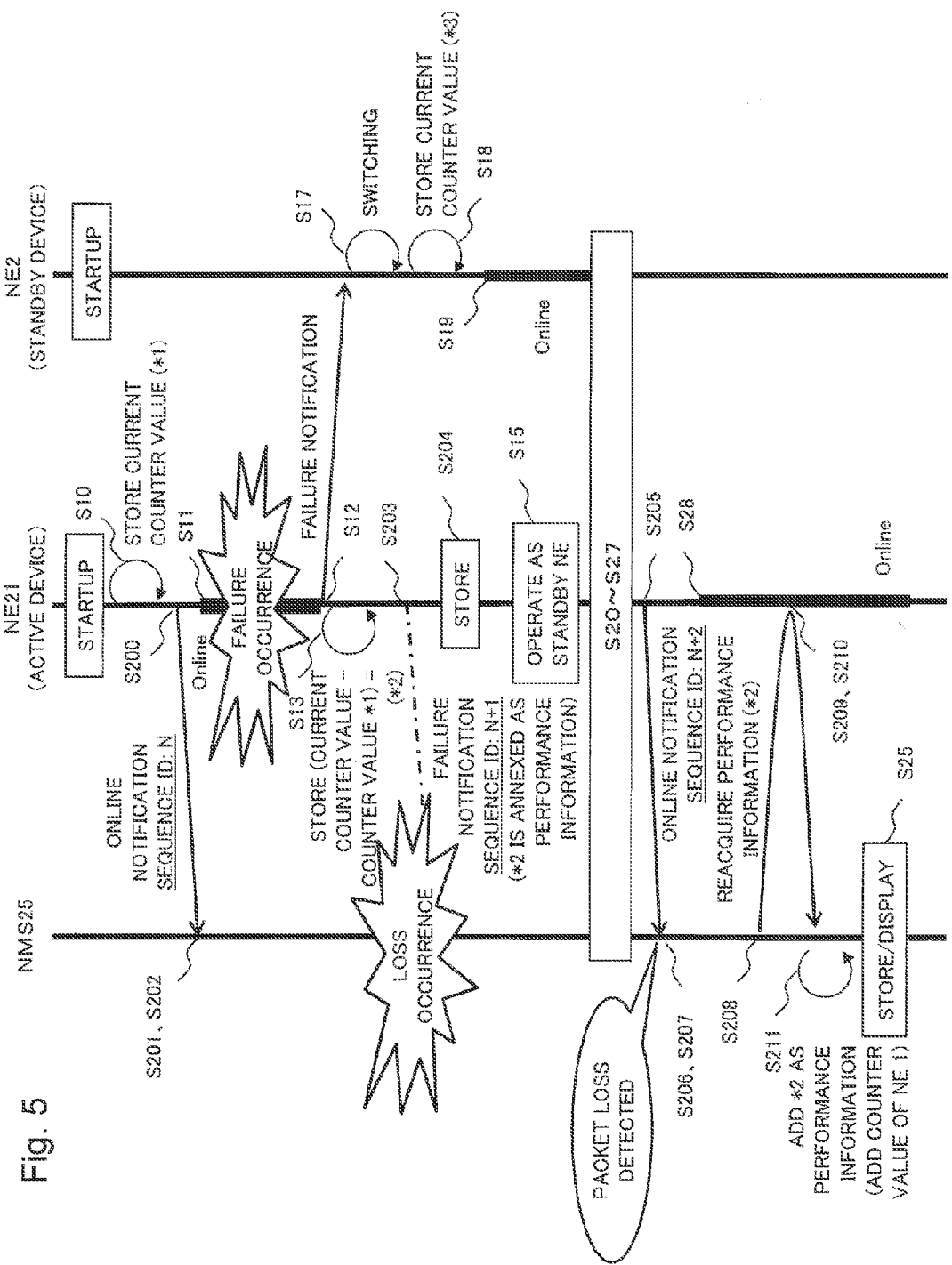
FIG. 5 is a diagram for explaining operation of the communication system in the second exemplary embodiment of the present invention.

FIG. 5 is a diagram for explaining operation of the communication system in the second exemplary embodiment of the present invention. Using FIG. 5, operation of the communication system in the present exemplary embodiment will be described below. Here, the initial value of the sequence ID is assumed to be N.

(S200)

First, upon performing S10 described above, the active NE 21 sends a packet indicating the start of communication, that is, an Online notification, to the NMS 25. Here, the active NE21 sends a sequence ID by including it in the Online notification. The present description will be continued below assuming that the active NE 21 has sent the sequence ID equal to the initial value N by including it in the Online notification.

(S201)

Upon receiving the Online notification from the active NE 21, the NMS 25 extracts the sequence ID (value N) from the Online notification, and stores the extracted sequence ID.

(S202)

Then, the NMS 25 distinguishes whether or not the sequence ID stored this time is incremented by 1 from that stored last time.

(Result of Distinguishing in S202)

At the present stage, there is no sequence ID stored last time, and in that case, the NMS 25 determines that the sequence ID stored this time is incremented by 1 from that stored last time. If it is determined that the increment between the sequence IDs is 1, the NMS 25 performs no operation, and waits to receive an Online notification or a failure notification next time.

(S203)

Next, after performing S200 described above, the active NE 21 performs S11 and then, when performing S12 and S13 upon failure occurrence, it increments the sequence ID (value N) by 1. Then, the active NE 21 sends, to the NMS 25, the incremented sequence ID (value N+1) and performance information stored in S13 described above, by including them in a failure notification.

(Loss of Failure Notification)

Here, the present description will be continued below assuming that the failure notification sent by the active NE 21 in S203 described above is lost between the active NE 21 and the NMS 25 and accordingly has not reached the NMS 25.

(S204)

After performing S203 described just above, the active NE 21 stores the sequence ID and performance information, both included in the failure notification in S203, in a manner to correlate them with each other.

(S15 and S17 to S27)

Next, the active NE 21, the standby NE 2 and the NMS 25 perform S15 and S17 to S27 described above, similarly to the communication system of the first exemplary embodiment.

(S205)

After performing S27 described above, the active NE 21 increments the sequence ID by 1, and sends an Online notification including the incremented sequence ID (value N+2) to the NMS 25.

(S206)

Upon receiving the Online notification from the active NE 21, the NMS 25 extracts the sequence ID (value N+2) from the Online notification, and stores the extracted sequence ID.

(S207)

Then, the NMS 25 distinguishes whether or not the sequence ID stored this time (value N+2) is incremented by 1 from that stored last time (value N).

(Result of Distinguishing in S207)

Here, the sequence ID stored this time (value N+2) is not equal to a value incremented by 1 from the sequence ID stored last time in S202 (value N). The present description will be continued below assuming that the NMS 25 has determined that the increment from the sequence ID stored last time to that stored this time is not 1. Here, as described above in "(result of distinguishing in S202)", if it has been determined that the increment is 1, the NMS 25 performs no operation, and waits to receive an Online notification or a failure notification next time.

(S208)

Having determined that the increment from the sequence ID stored last time to that stored this time is not 1, the NMS 25 sends to the active NE 21 a packet for requesting it to resend performance information, that is, a reacquisition notification.

At that time, the NMS 25 includes a sequence ID (value N+1) between the sequence IDs stored this time (value N+2) and last time (value N) in the reacquisition notification to be sent.

(S209)

Upon receiving the reacquisition notification from the NMS 25, the active NE 21 extracts the sequence ID (value N+1) from the reacquisition notification.

(S210)

Having extracted the sequence ID (value N+1), the active NE 21 reads out performance information which was stored in S204 in a manner to be correlated with the extracted sequence ID, and outputs the readout performance information to the NMS 25, by including it in a packet representing a response to the reacquisition notification, that is, a reacquisition response notification.

(S211)

Receiving the reacquisition response notification inputted from the active NE 21, the NMS 25 extracts, from the reacquisition response notification, performance information, that is, the number of communication data sendings/receptions, and adds the number to that extracted previously, if it exists.

(S25)

Similarly to in S25 already described above, when a predetermined time point has come, the NMS 25 stores the number of communication data sendings/receptions summed up until the time point, into the memory provided in itself.

After that, while it is not illustrated, if a predetermined operation is performed by the administrator (NMS operator) of the communication system of the present exemplary embodiment, the NMS 5 displays the stored performance information on the screen provided in itself. As a result, the NMS 25 can display the number of communication data sendings/receptions, that is, performance information measured by the NEs 1 and 2 while operating as the active NE, without missing any performance information.

While it has been described above that the active NE 21 increments the sequence ID by 1, the number is not limited to 1, and the active NE 21 may increment the sequence ID by a predetermined value other than 1. The predetermined value is set to the active NE 21 by the administrator of the communication system of the present exemplary embodiment. In that case, upon receiving an Online notification or a failure notification, the NMS 25 stores a sequence ID extracted from them and distinguishes whether or not a sequence ID stored this time is larger by the predetermined number than a sequence ID stored last time, instead of performing S207 described above. If determining that the sequence ID stored this time is not larger by the predetermined number, the NMS 25 sends a reacquisition notification to the active NE 21, instead of performing S208 described above.

While the above description has been given of a case where the active NE 21 sends to the NMS 25 a sequence ID by including it in a failure notification or in an Online notification, also the standby NE 2 may send to the NMS 25 a sequence ID by including it in a failure notification or in an Online notification. In that case, similarly to the active NE 21, the standby NE 2 performs the operations of S200, S203 to S205 and S209 to S210 described above. Then, upon receiving a failure notification or an Online notification from the standby NE 2, the NMS 25 extracts and stores the sequence ID and distinguishes whether or not thus stored sequence ID is larger by a predetermined number than a sequence ID stored last time, similarly to in S201 to S202 and S206 to 208 described above.

If determining that the sequence ID stored this time is not larger by the predetermined number, the NMS 25 sends a reacquisition notification to the standby NE 2. The predetermined number is set to the NMS 25 by the administrator of the communication system of the present exemplary embodiment.

(About Sequence ID)

While it has been described above that a sequence ID is included in a failure notification or an Online notification, a notification to include a sequence ID is not limited to the failure notification or Online notification. It is general that the NEs output a predetermined notification to the NMS also when some setting change is made or some state change occurs. Such notifications are collectively called "event notifications" including the failure notification and the Online notification. In the present exemplary embodiment, each of the NEs may output to the NMS 25 a sequence ID by including it in each event notification. In that case, the NMS 25 performs S201 to S202 and S206 to S208 described above, where both "failure notification" and "Online notification" are read as "event notification". As a result, the NMS 25 more frequently extracts a sequence ID and performs the distinguishing in S202 and S207 described above, and therefore, when performance information has not reached yet, the NMS 25 can output a reacquisition notification earlier and accordingly can acquire (store) earlier the performance information having not reached.

Description of Advantageous Effect

According to the communication system of the present exemplary embodiment, the NMS 25 can display performance information measured by the NEs 1 and 2 while operating as the active NE, without missing any performance information.

It is because the NMS 25 checks whether a sequence ID outputted along with performance information from the NE 21 is incremented by 1 from the one received last time, and then, in case the increment is not 1, the NMS 25 requests the NE to resend performance information corresponding to the missing sequence ID.

Third Exemplary Embodiment

Next, a third exemplary embodiment of the present invention will be described.

[Description of Configuration]

Figure 6:
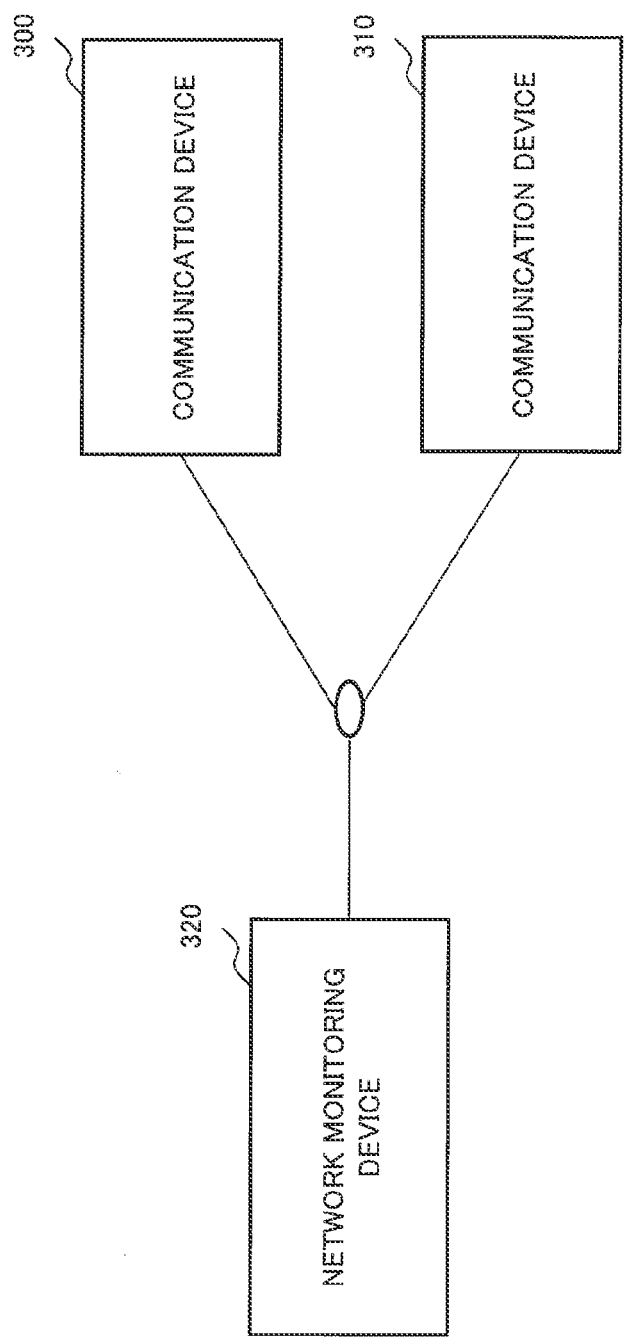
FIG. 6 is a diagram showing an example of a configuration of a communication system in a third exemplary embodiment of the present invention.

FIG. 6 is a diagram showing an example of a configuration of a system in the third exemplary embodiment of the present invention.

As shown in FIG. 6, the system in the third exemplary embodiment comprises communication devices 300 and 310 and a network monitoring device 320. The communication devices 300 and 310 are each connected with the network monitoring device 320.

The communication device 300 constitutes a redundant configuration together with the other communication device 310. That is, after being started up, one of the communication devices 300 and 310 performs predetermined operation as the current active device of the redundant configuration, and then, upon occurrence of a failure in itself, hands over its processing to the current reserve device. After the startup, the other one of the communication devices 300 and 310 stands by as the current reserve device of the redundant configuration, and then, upon occurrence of a failure in the current active device, takes over processing from the current active device and performs the predetermined operation as the current active device. The predetermined operation may be that of communicating with other communication devices (which are not illustrated).

In parallel with the predetermined operation, the communication devices 300 and 310 each measure predetermined information at constant time intervals after the startup. The predetermined information may be the number of pieces of communication data sent to or received from other devices (not illustrated) while communicating with them.

Upon occurrence of a predetermined event, the communication devices 300 and 310 output the predetermined information they have measured while performing the predetermined operation as the current active device of the redundant configuration, to the network monitoring device 320. The predetermined event may be occurrence of a failure in the current active device itself.

The network monitoring device 320 displays the predetermined information inputted from the communication devices 300 and 310, that is, predetermined information measured by the communication devices 300 and 310 while they were operating as the current active device.

[Description of Operation]

First, it is assumed that, after being started up, the communication device 300 performed predetermined operation as the active device and, upon occurrence of its own failure, handed over its processing to the reserve communication device 310, and then the reserve communication device 310 has performed the predetermined operation as the current active system.

The predetermined operation may be that of communicating with other devices (which are not illustrated).

It is also assumed that the communication devices 300 and 310 each have measured predetermined information at constant time intervals after the startup. The predetermined information may be the number of pieces of communication data sent to or received from other devices (not illustrated) while communicating with them.

Upon occurrence of a predetermined event, the communication devices 300 and 310 output the predetermined information they have measured while performing the predetermined operation as the active device of the redundant configuration, to the network monitoring device 320. The predetermined event may be, but is not limited to, occurrence of a failure in the device itself. The predetermined event may be that a predetermined time point has come. The predetermined time point is set to each of the communication devices 300 and 310 by an administrator of the communication system of the present exemplary embodiment.

Upon the predetermined information being inputted from the communication devices 300 and 310, that is, the predetermined information measured by them while operating as the active device being inputted, the network monitoring device 320 displays the information on a screen provided in itself.

Description of Advantageous Effect

According to the present exemplary embodiment, an administrator of a communication system can promptly check performance information measured by a plurality of devices comprised in the system while they were performing a predetermined operation.

It is because, in the communication system according to the present exemplary embodiment, each of the plurality of devices outputs, to a network monitoring device, only performance information it has measured while performing the predetermined operation (hereafter, referred to as "useful performance information"). As a result, the network monitoring device can display only such useful performance information, and accordingly the system administrator can promptly check the useful performance information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-270681 filed on Dec. 27, 2013, the disclosure of which is incorporated herein in its entirety by reference.

The whole or part of the exemplary embodiments disclosed above can be described as, but not limited to, the following supplementary notes.

(Supplementary Note 1)

A communication device connected to a network monitoring device, together with another communication device, wherein the communication device constitutes a redundant configuration together with the another communication device and, upon occurrence of a predetermined event, outputs predetermined information it has measured while performing a predetermined operation as the active device of the redundant configuration, to the network monitoring device.

(Supplementary Note 2)

The communication device according to Supplementary Note 1, wherein upon occurrence of the predetermined event, the communication device increments a predetermined number by a predetermined value and then outputting the incremented predetermined number along with the predetermined information, and stores the predetermined number and the predetermined information in a manner to correlate them with each other; and wherein if receiving a request for resending of the predetermined information, the communication device outputs the predetermined information stored in a manner to be correlated with the predetermined number included in the request, to the network monitoring device.

(Supplementary Note 3)

The communication device according to Supplementary Note 1 or 2, wherein the communication device, after occurrence of the predetermined event, outputs the difference between a value corresponding to the predetermined information before performing the predetermined operation and a value corresponding to the predetermined information before the predetermined event, as the predetermined information to output.

(Supplementary Note 4)

The communication device according to any one of Supplementary Notes 1 to 3, wherein the predetermined operation is that of performing communication with a predetermined device.

(Supplementary Note 5)

The communication device according to any one of Supplementary Notes 1 to 4, wherein the occurrence of the predetermined event is occurrence of a failure in the communication device itself.

(Supplementary Note 6)

A network monitoring device for monitoring a redundant system in which a plurality of communication devices are each switched between being an active device and being a reserve device, of the redundant system, wherein the network monitoring device displays predetermined information measured by the plurality of communication devices while they were operating as an active device of the redundant system.

(Supplementary Note 7)

A system comprising a plurality of communication devices and a network monitoring device, wherein the communication devices are communication devices according to any one of Supplementary Notes 1 to 5, and the network monitoring device is the network monitoring device according to Supplementary Note 6.

(Supplementary Note 8)

The system according to Supplementary Note 7, wherein:

the communication devices are communication devices according to any one of Supplementary Notes 2 to 5; and if the predetermined number inputted this time is not a value larger by the predetermined value than the predetermined number inputted last time, the network monitoring device requests the corresponding one of the communication devices to resend the predetermined information, by including in the request the predetermined number of a value between those of the predetermined numbers inputted respectively, this time and last time.

(Supplementary Note 9)

An information notification method, wherein each of first means together constituting a redundant configuration, upon occurrence of a predetermined event, notifies predetermined information it has measured while performing a predetermined operation as an active system, to a second means.

(Supplementary Note 10)

The information notification method according to Supplementary Note 9, wherein the second means displays the predetermined information notified from the first means.

(Supplementary Note 11)

The information notification method according to Supplementary Note 9 or 10, wherein each of the first means, upon occurrence of the predetermined event, increments a predetermined number by a predetermined value and then outputs the incremented predetermined number along with the predetermined information, and stores the predetermined number and the predetermined information in a manner to correlate them with each other;

if the predetermined number inputted this time is not a value larger by the predetermined value than the predetermined number inputted last time, the second means requests the corresponding one of the first means to resend the predetermined information, by including in the request the predetermined number of a value between those of the predetermined numbers inputted, respectively, this time and last time; and the corresponding first means outputs the predetermined information stored in a manner to be correlated with the predetermined number included in the request, to the second means.

(Supplementary Note 12)

The information notification method according to any one of Supplementary Notes 9 to 11, wherein each of the first means, after occurrence of the predetermined event, notifies the difference between a value corresponding to the predetermined information before performing the predetermined operation and that corresponding to the predetermined information before the predetermined event, as the predetermined information.

(Supplementary Note 13)

The information notification method according to any one of Supplementary Notes 9 to 12, wherein the predetermined operation is that of performing communication with a predetermined device.

(Supplementary Note 14)

The information notification method according to any one of Supplementary Notes 9 to 13, wherein the predetermined event is occurrence of a failure in the first means themselves.

(Supplementary Note 15)

The information notification method according to any one of Supplementary Notes 9 to 14, wherein the predetermined event is occurrence of degradation in the communication quality of a wireless channel while the first means are communicating with the predetermined device via the wireless channel.

(Supplementary Note 16)

The information notification method according to any one of Supplementary Notes 9 to 15, wherein the predetermined information is information including any of, or any combination of, the number of communication data sendings/receptions, an error rate of communication data, a transmission rate, a modulation/demodulation method, a transmission power amount, a reception power amount and information about system operation.

(Supplementary Note 17)

The communication device according to any one of Supplementary Notes 1 to 5, wherein the predetermined information is information including any of, or any combination of, the number of communication data sendings/receptions, an error rate of communication data, a transmission rate, a modulation/demodulation method, a transmission power amount, a reception power amount and information about system operation.

(Supplementary Note 18)

The communication device according to any one of Supplementary Notes 1 to 5 and 17, wherein the predetermined event is occurrence of degradation in the communication quality of a wireless channel while the communication device is communicating with the predetermined device via the wireless channel.

(Supplementary Note 19)

The communication device according to any one of Supplementary Notes 1 to 5, 17 and 18, wherein the predetermined event is that a signal for requesting performance information is inputted.

(Supplementary Note 20)

The network monitoring device according to Supplementary Note 6, wherein the network monitoring device outputs a signal for requesting performance information at a predetermined time interval.

(Supplementary Note 21)

The network monitoring device according to Supplementary Note 6 or 20, wherein the network monitoring device displays the predetermined information inputted to it, at a predetermined time interval.

(Supplementary Note 22)

The system according to Supplementary Note 7 or 8, wherein the network monitoring device displays the predetermined information inputted to it, at a predetermined time interval.

(Supplementary Note 23)

The information notification method according to any one of Supplementary Notes 9 to 16, wherein the second means displays the predetermined information notified to it, at a predetermined time interval.

REFERENCE SIGNS LIST 1, 2, 3, 4, 21 NE
5, 25 NMS
6 wireless channel
7 PSN (Public Switched Network)
300, 310 communication device
320 network monitoring device

The invention claimed is:

1. A communication device connected to a network monitoring device, together with another communication device, wherein the communication device constitutes a redundant configuration together with the another communication device, the communication device comprising:

a memory storing information, and
a processor configured to output predetermined information it has measured while performing a predetermined operation as the active device of the redundant configuration, to the network monitoring device, upon occurrence of a predetermined event;

wherein upon occurrence of the predetermined event, the processor increments a predetermined number by a predetermined value and then outputs the incremented predetermined number along with the predetermined information, and stores the predetermined number and the predetermined information in the memory in a manner to correlate them with each other; and wherein if receiving a request for resending of the predetermined information, the processor outputs the predetermined information stored in the memory in a manner to be correlated with the predetermined number included in the request, to the network monitoring device.

2. The communication device according to claim 1, wherein the processor, after occurrence of the predetermined event, outputs the difference between a value corresponding to the predetermined information before performing the predetermined operation and a value corresponding to the predetermined information before the predetermined event, as the predetermined information to output.

3. The communication device according to claim 1, wherein the predetermined operation is that of performing communication with a predetermined device.

4. The communication device according to claim 1, wherein the occurrence of the predetermined event is occurrence of a failure in the communication device itself.

5. A system comprising:

a plurality of communication devices and a network monitoring device, wherein the communication devices are communication devices according to claim 1, and the network monitoring device is the network monitoring device for monitoring a redundant system in which a plurality of communication devices are each switched between being an active device and being are reserve device, of the redundant system, wherein the network monitoring device displays predetermined information measured by the plurality of communication devices while they were operating as an active device of the redundant system, wherein if the predetermined number inputted this time is not a value larger by the predetermined value than the predetermined number inputted last time, the network monitoring device requests the corresponding one of the communication devices to resend the predetermined information, by including in the request the predetermined number of a value between those of the predetermined numbers inputted respectively, this time and last time.

6. The system according to claim 5, wherein the network monitoring device displays the predetermined information inputted to it, at a predetermined time interval.

7. The communication device according to claim 1, wherein the predetermined event is that a signal for requesting performance information is inputted.

8. An information notification method comprising:

outputting predetermined information it has measured while performing a predetermined operation as an active system of a redundant configuration, upon occurrence of a predetermined event;

wherein upon occurrence of the predetermined event, incrementing a predetermined number by a predetermined value and then outputting the incremented predetermined number along with the predetermined information, and storing the predetermined number and the predetermined information in a manner to correlate them with each other; and wherein if receiving a request for resending of the predetermined information, outputting the predetermined information stored in a manner to be correlated with the predetermined number included in the request.

9. The information notification method according to claim 8, wherein
 after occurrence of the predetermined event, outputting the difference between a value corresponding to the predetermined information before performing the predetermined operation and that corresponding to the predetermined information before the predetermined event, as the predetermined information.

10. The information notification method according to claim 8, wherein
 the predetermined operation is that of performing communication with a predetermined device.

11. The information notification method according to claim 8, wherein
 the predetermined event is occurrence of a failure.

12. The information notification method according to claim 8, wherein
 the predetermined event is occurrence of degradation in the communication quality of a wireless channel while communicating with the predetermined device via the wireless channel.

* * * * *

UNITED STATES PATENT AND TRADEMARK OFFICE
CERTIFICATE OF CORRECTION

PATENT NO.         : 10,194,008 B2
APPLICATION NO.    : 15/108002
DATED              : January 29, 2019
INVENTOR(S)        : Hajime Iwata It is certified that error appears in the above-identified patent and that said Letters Patent is hereby corrected as shown below:

Claim 5, Column 22, Lines 29-30, "and being are reserved device" should read as --and being a reserved device--.

Signed and Sealed this
Thirtieth Day of April, 2019

Andrei Iancu
*Director of the United States Patent and Trademark Office*